US007648011B2

(12) United States Patent
Kwoka et al.

(10) Patent No.: US 7,648,011 B2
(45) Date of Patent: Jan. 19, 2010

(54) COMPACT DRIVE ASSEMBLY WITH MULTI-PLATE COUPLING

(75) Inventors: Georg Kwoka, Much (DE); Adrian Chludek, St. Augustin (DE); Bernd Bender, Köln (DE)

(73) Assignee: GKN Driveline International GmbH, Lohmar (DE)

( * ) Notice: Subject to any disclaimer, the term of this patent is extended or adjusted under 35 U.S.C. 154(b) by 481 days.

(21) Appl. No.: 10/570,774

(22) PCT Filed: Aug. 14, 2004

(86) PCT No.: PCT/EP2004/009133

§ 371 (c)(1),
(2), (4) Date: Nov. 20, 2006

(87) PCT Pub. No.: WO2005/028235

PCT Pub. Date: Mar. 31, 2005

(65) Prior Publication Data

US 2007/0151823 A1    Jul. 5, 2007

(30) Foreign Application Priority Data

Sep. 5, 2003    (DE)    ................................. 103 40 912

(51) Int. Cl.
*B60K 23/08*    (2006.01)
*B60K 17/35*    (2006.01)

(52) U.S. Cl. .................. 192/84.6; 192/70.23; 192/84.7; 192/112

(58) Field of Classification Search ................ 192/84.6, 192/112
See application file for complete search history.

(56) References Cited

U.S. PATENT DOCUMENTS

| 5,423,235 | A  |   | 6/1995  | Botterill et al. |        |
|-----------|----|---|---------|------------------|--------|
| 5,556,350 | A  | * | 9/1996  | Madsack          | 475/85 |
| 5,979,631 | A  |   | 11/1999 | Lundström        |        |
| 6,012,560 | A  |   | 1/2000  | Kuroda et al.    |        |
| 6,585,094 | B2 | * | 7/2003  | Okude et al.     | 192/35 |
| 6,622,838 | B2 | * | 9/2003  | Suzuki           | 192/35 |
| 6,685,594 | B2 |   | 2/2004  | Kanazawa         |        |
| 7,210,565 | B2 | * | 5/2007  | Yamazaki et al.  | 192/35 |

FOREIGN PATENT DOCUMENTS

DE    40 21 747 A1    1/1992

* cited by examiner

*Primary Examiner*—Richard M. Lorence
(74) *Attorney, Agent, or Firm*—Rader, Fishman & Grauer, PLLC

(57) ABSTRACT

A drive assembly for the driveline of a motor vehicle with an axle which can be driven when required. The drive assembly includes a drive and a multi-plate coupling. The drive comprises a drive housing with a sleeve-shaped projection in which a drive input shaft is rotatably supported. The multi-plate coupling which is rotatably supported in a coupling housing connected to the drive housing comprises a coupling input part for introducing torque and a coupling output part connected to the drive input shaft in a rotationally fast way. The multi-plate coupling is arranged coaxially on the outside relative to the sleeve-shaped projection and partially axially covers the latter.

19 Claims, 1 Drawing Sheet

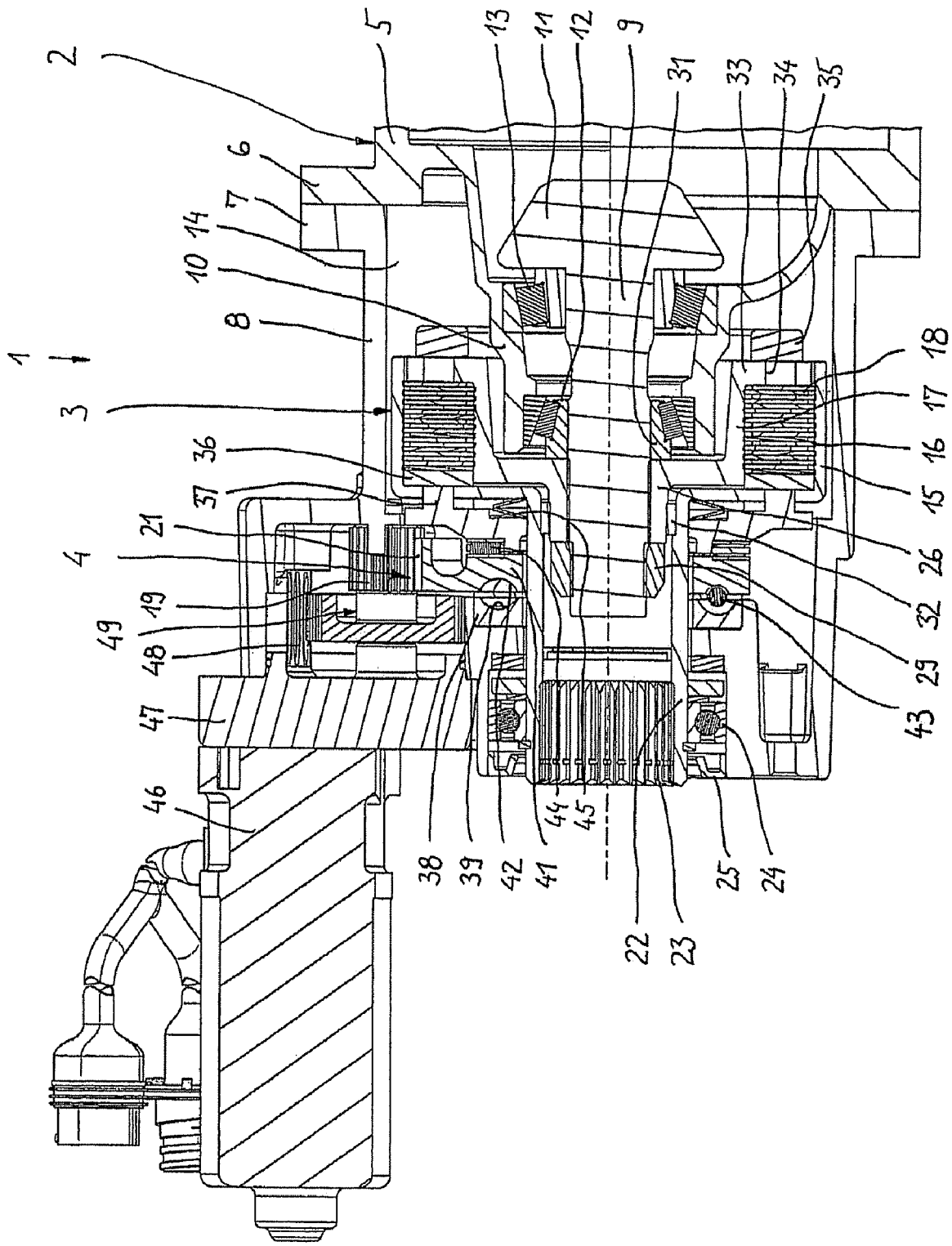

COMPACT DRIVE ASSEMBLY WITH MULTI-PLATE COUPLING

BACKGROUND

The invention relates to a drive assembly for use in the driveline of a motor vehicle with a plurality of drivable axles. Such drive assemblies are already known from the state of the art. For example, DE 40 21 747 C2 proposes a drive assembly for a motor vehicle with two drivable axles of which a first one is permanently driven by a drive unit and a second one can be hooked up by an externally controllable double coupling assembly. The latter comprises a common drivable coupling housing with two sets of plates which sets each comprise outer plates connected to the coupling carrier in a rotationally fast way and individual sets of inner plates connected to the sideshafts of the second driving axle in a rotationally fast way.

From U.S. Pat. No. 5,423,235 there is known a drive assembly which comprises a multi-plate coupling arranged on a longitudinal axis and a differential drive following, and connected to, said multi-plate coupling. The multi-plate coupling comprises a carrier with outer plates being connected thereto in a rotationally fast way, as well as a hub with inner plates connected thereto in a rotationally fast way, with the outer plates and inner plates being arranged so as to axially alternate relative to one another. The coupling carrier, in a rotationally fast way, is connected to a driving journal for driving the differential drive. The multi-plate coupling and the differential drive are arranged in a two-part housing which comprises two chambers separated from one another by a wall with a sleeve-shaped projection. A driving journal for driving the differential drive is rotatably supported in the sleeve-shaped projection. The multi-plate coupling is arranged so as to axially adjoin the sleeve-shaped projection.

A similar assembly is known from U.S. Pat. No. 5,979,631 wherein a driving journal for driving a differential drive and a multi-plate coupling for connecting a torque to be applied to the driving journal are supported in a common housing.

SUMMARY OF THE INVENTION

It is an object of the present invention to provide a drive assembly for use in the driveline of a motor vehicle with an optionally drivable axle wherein the axial installation space is shortened and the weight reduced as compared to conventional assemblies.

In accordance with an embodiment of the invention, a drive assembly for use in the driveline of a motor vehicle is provided, comprising a drive with a drive housing which comprises a sleeve-shaped projection in which the drive input shaft is rotatably supported, and a multi-plate coupling which is arranged ahead of, and connected to, the drive. The multi-plate coupling is rotatably supported in a coupling housing connected to the drive housing and, furthermore, comprises a coupling input part for introducing torque and a coupling output part connected to the drive input shaft in a rotationally fast way. The multi-plate coupling is arranged coaxially externally relative to the sleeve-shaped projection and at least partially axially covers said sleeve-shaped projection.

Said drive assembly is advantageous in that the axial installation space can be shortened considerably and the weight can also be reduced. The sleeve-shaped projection supporting the drive input shaft can be slid deeply into the coupling housing, so that the entire drive assembly has a compact design.

According to one embodiment, the multi-plate coupling comprises a set of coupling plates which are provided for the transmission of torque and which, axially alternately, are connected to the coupling input part and to the coupling output part in a rotationally fast way, wherein the set of coupling plates at least partially axially overlaps the sleeve-shaped projection.

According to a further embodiment, the multi-plate coupling comprises a carrier firmly connected to the coupling input part and a hub firmly connected to the coupling output part, wherein outer plates of the set of coupling plates are connected in a rotationally fast way to the carrier and inner plates of the set of coupling plates are connected to the hub in a rotationally fast way.

The drive input shaft can be supported by two axially spaced rolling contact bearings in the sleeve-shaped projection of the drive housing, wherein the set of coupling plates axially overlaps at least one of the rolling contact bearings. This design results in a particularly short axial installation length.

According to yet a further embodiment of the invention, the coupling input part is designed in the shape of a hollow shaft whose inner diameter is greater than the outer diameter of the drive input shaft, wherein the hollow shaft is arranged coaxially relative to the drive input shaft and partially axially covers same. This design measure constitutes a further measure for achieving a compact drive assembly.

The coupling output part of the multi-plate coupling is provided in the form of a sleeve which, via a toothing engagement, is connected in a rotationally fast way to the drive input shaft and is axially secured by a securing ring against an inner bearing race of the rolling contact bearing at the coupling end. The outer diameter of the sleeve is smaller than the inner diameter of the hollow shaft of the coupling, so that the two components can be arranged so as to axially overlap one another. The hollow shaft can also be rotatably supported by a first bearing in the coupling housing and by a second bearing on the sleeve.

According to yet a further embodiment, the set of coupling plates is supported against a supporting disc connected to the hub and can be loaded by a pressure disc, wherein there is provided a setting device for actuating the multi-plate coupling by loading the pressure disc. The pressure disc is loaded relative to the supporting disc by actuating the setting device, so that the multi-plate coupling is closed. In this way, a torque introduced via the propeller shaft of the motor vehicle is transmitted also to the second driving axle.

The setting device can be provided in different designs; more particularly, use is made of hydraulic, electromotive or electromagnetic drives. In one embodiment, the setting device is provided in the form of a ball ramp assembly which comprises two opposed discs with ball grooves whose pitch extends circumferentially in opposite directions, as well as balls held in the ball grooves, wherein one of the discs is positioned in the coupling housing in a rotationally fast way and the other disc is rotatingly drivable via an electric motor and at least indirectly loads the pressure disc. By switching on the electric motor, the drivable disc is rotated relative to the disc fixedly positioned in the coupling housing, so that its axial distance axially increases when the balls roll in the ball grooves and the multi-plate coupling is loaded. The drivable disc is preferably being radially centered by the balls relative to the disc arranged in the housing.

In another embodiment, the drive is a differential drive which comprises a differential gear set driven by the drive input shaft, as well as a first output shaft and a second output shaft driven by same. The first and the second output shafts are associated with a second motor vehicle axle which, if required, can be drivingly connected.

BRIEF DESCRIPTION OF THE DRAWINGS

A preferred embodiment of the invention will be described below with reference to the drawing which, in a longitudinal section, shows a drive assembly in accordance with one embodiment of the invention.

DETAILED DESCRIPTION

The FIGURE shows a drive assembly which serves to be used in the driveline of a motor vehicle (not shown) with several drivable axles. A first driving axle is driven permanently and a second axle can optionally be connected to transmit torque to two axle shafts. The drive assembly 1 comprises a differential drive 2 shown only partially, a multi-plate coupling 3 for connecting the differential drive 2 and a setting device 4 for actuating the multi-plate coupling 3.

The differential drive 2 comprises a drive housing 5 with a flange 6 for being attached to a flange 7 of the coupling housing 8, as well as a sleeve-shaped projection 10 which projects outwardly from the drive housing 5 into the coupling housing 8 and serves to support a drive input shaft which is provided in the form of a driving journal 9 with a bevel gear 11. The driving journal 9 is supported by two rolling contact bearings 12, 13 in an O-arrangement in the sleeve-shaped projection 10.

The coupling housing 8 is cylindrically shaped and arranged coaxially relative to the projection 10, while almost completely covering the latter. In this way, there is formed an annular chamber 14 between the cylindrical coupling housing 8 and the sleeve-shaped projection 10. The multi-plate coupling 3 is arranged in the annular chamber 14 in such a way that it axially covers the sleeve-shaped projection 10 partially and the rolling contact bearing 12 at the coupling end completely, thus achieving a compact design for the drive assembly 1 with a relatively short installation length.

The multi-plate coupling 3 comprises a carrier 15 holding outer plates 16 in a rotationally fast and axially displaceable way, as well as a hub 17 on which inner plates 18 are held in a rotationally fast and axially displaceable way. The outer plates 16 and the inner plates 18 are arranged so as to axially alternate relative to one another and form the set of coupling plates. The carrier 15 is formed so as to be integral with a coupling input part provided in the form of a hollow shaft 22. The hollow shaft 22 serves to introduce a torque from a motor vehicle propeller shaft (not illustrated) into the drive assembly. For this purpose, there is provided a longitudinal toothing 23 which can be engaged in a rotationally fast way by a correspondingly designed outer toothing of the propeller shaft. At the coupling end, the hollow shaft 22 is rotatably supported by a first bearing 24 in the coupling housing 8, with the annular space formed between the coupling housing 8 and the hollow shaft 22 being sealed by a sealing ring 25.

The hub 17 of the multi-plate coupling 3 is connected in a rotationally fast way to a coupling output part in the form of a sleeve 26, with said parts being produced to form one piece. For torque transmitting purposes, the teeth of the sleeve 26 engage the teeth of the driving journal 9. The sleeve 26 is tensioned by a securing ring 29 which is threaded on to the driving journal 9 and which is provided in the form of a nut. The sleeve 26 is thus axially loaded against an inner bearing race 31 of the rolling contact bearing 12 at the coupling end and rotatably supported radially by a second bearing 32 in the hollow shaft 22. The hollow shaft 22 and the sleeve 26 connected to the driving journal 9 in a rotationally fast way overlap, thus achieving a short axial installation length.

At the drive end, the hub 17 comprises a formed-on supporting disc 33 against which the set of coupling plates 16, 18 is axially supported. In the supporting disc 33, there are provided several circumferentially distributed bores 34 which, upon rotation of the multi-plate coupling 3, convey oil by a conveying wheel 35 attached to the supporting disc 33 from the interior of the coupling housing 8 into the coupling carrier 15 for cooling and lubrication purposes.

Opposite the supporting disc 33 there is arranged a pressure disc 36 which serves to load the intermediate coupling plates 16, 18. The pressure disc 36 can be operated via the setting disc 37 by the setting device which is provided in the form of a ball ramp assembly 4.

The ball ramp assembly 4 comprises a first disc 38 comprising first ball grooves 39 and firmly positioned in the coupling housing 8, a second disc 41 which is arranged opposite the first disc 38 and comprises second ball grooves 42 and which is rotatingly drivable and rotatable relative to the first disc 38, as well as balls 43 held in the ball grooves 39, 42. The pitch of the first ball grooves 39 extends circumferentially in the opposite direction relative to that of the second ball grooves 42, so that a rotation of the second disc 41 relative to the first disc 38 causes an axial displacement of the second disc 41 towards the multi-plate coupling 3, with the second disc 41 being radially centered via the balls 43 relative to the first disc 38 and supported via an axial bearing 44 relative to the setting disc 37. The setting disc 37 is axially displaceable relative to the coupling carrier 15, with there being provided spring mechanism 45 which loads the setting disc 37 away from the multi-plate coupling 3. In the unactuated condition of the ball ramp assembly 4, the pressure disc 36 is thus unloaded, so that the coupling carrier 15 is able rotate relative to the coupling hub 17, with no torque being transmitted to the driving journal 9. By actuating the ball ramp assembly 4 by an electric motor 46, for example, the two discs 38, 41 are rotated relative to one another, so that the rotatable second disc 41 is axially displaced towards the multi-plate coupling 3. In this way, the outer plates 16 and the inner plates 18 are axially loaded between the supporting disc 33 and the pressure disc 36, so that torque is transmitted from the propeller shaft of the motor vehicle to the driving journal 9 of the differential drive. The second axle of the motor vehicle is thus connected.

The electric motor 46 is flanged to the coupling housing 8 by an adapter 47. The second disc 41 is driven via an output shaft 48 and a transmission stage 49, with a driven spur gear 19, via teeth 21, engaging the second disc 41.

What is claimed is:

1. A drive assembly for a driveline of a motor vehicle with an axle which is selectively drivable, the assembly comprising:

a drive with a drive housing comprising a sleeve-shaped projection in which a drive input shaft is rotatably supported; and a multi-plate coupling which is arranged ahead of the drive, the multi-plate coupling being rotatably supported in a coupling housing connected to the drive housing and, further comprising a coupling input part for introducing torque and a coupling output part connected to the drive input shaft in a rotationally fast way, wherein the multi-plate coupling is arranged coaxially externally relative to the sleeve-shaped projection and at least partially axially overlaps said sleeve-shaped projection; and wherein the multi-plate coupling comprises a set of coupling plates for the transmission of torque and which, axially alternately, are connected to the coupling input part and to the coupling output part in a rotationally fast way, wherein the set of coupling plates at least partially axially overlaps the sleeve-shaped projection.

2. A drive assembly according to claim 1, wherein the multi-plate coupling comprises a carrier firmly connected to the coupling input part and a hub firmly connected to the coupling output part, wherein outer plates of the set of coupling plates are connected in a rotationally fast way to the carrier and inner plates of the set of coupling plates are connected to the hub.

3. A drive assembly according to claim 1, wherein the coupling input part comprises a hollow shaft whose inner diameter is greater than the outer diameter of the drive input shaft, wherein the hollow shaft is arranged coaxially relative to the drive input shaft and partially axially overlaps same.

4. A drive assembly according to claim 3, wherein the hollow shaft is rotatably supported by a first bearing in the coupling housing and by a second bearing on the coupling output part.

5. A drive assembly according to claim 1, wherein the set of coupling plates is supported against a supporting disc connected to a hub and can be loaded by a pressure disc, wherein a setting device is provided for actuating the multi-plate coupling by loading the pressure disc.

6. A drive assembly according to claim 5, wherein the setting device comprises a ball ramp assembly which having two opposed discs with ball grooves whose pitch extends circumferentially in opposite directions, and balls held in the ball grooves, wherein one of the discs is positioned in the coupling housing in a rotationally fast way and the other disc is rotatingly drivable via an electric motor and at least indirectly loads the pressure disc.

7. A drive assembly according to claim 6, wherein the drivable disc is radially centered by the balls relative to the disc arranged in the coupling housing.

8. A drive assembly for a driveline of a motor vehicle with an axle which is selectively drivable, the assembly comprising:
 a drive with a drive housing comprising a sleeve-shaped projection in which a drive input shaft is rotatably supported; and
 a multi-plate coupling which is arranged ahead of the drive, the multi-plate coupling being rotatably supported in a coupling housing connected to the drive housing and,
 further comprising a coupling input part for introducing torque and a coupling output part connected to the drive input shaft in a rotationally fast way, wherein the multi-plate coupling is arranged coaxially externally relative to the sleeve-shaped projection and at least partially axially overlaps said sleeve-shaped projection; and
 wherein the drive input shaft is supported by two axially spaced rolling contact bearings in the sleeve-shaped projection of the drive housing, wherein the multi-plate coupling axially overlaps at least one of the rolling contact bearings.

9. A drive assembly according to claim 8, wherein the coupling input part comprises a hollow shaft whose inner diameter is greater than the outer diameter of the drive input shaft, wherein the hollow shaft is arranged coaxially relative to the drive input shaft and partially axially overlaps same.

10. A drive assembly according to claim 8, wherein the hollow shaft is rotatably supported by a first bearing in the coupling housing and by a second bearing on the coupling output part.

11. A drive assembly according to claim 8, wherein the multi-plate coupling comprises a set of coupling plates, which set of coupling plates is supported against a supporting disc connected to a hub and can be loaded by a pressure disc, wherein a setting device is provided for actuating the multi-plate coupling by loading the pressure disc.

12. A drive assembly according to claim 11, wherein the setting device comprises a ball ramp assembly which having two opposed discs with ball grooves whose pitch extends circumferentially in opposite directions, and balls held in the ball grooves, wherein one of the discs is positioned in the coupling housing in a rotationally fast way and the other disc is rotatingly drivable via an electric motor and at least indirectly loads the pressure disc.

13. A drive assembly according to claim 12, wherein the drivable disc is radially centered by the balls relative to the disc arranged in the coupling housing.

14. A drive assembly for a driveline of a motor vehicle with an axle which is selectively drivable, the assembly comprising:
 a drive with a drive housing comprising a sleeve-shaped projection in which a drive input shaft is rotatably supported; and
 a multi-plate coupling which is arranged ahead of the drive, the multi-plate coupling being rotatably supported in a coupling housing connected to the drive housing and,
 further comprising a coupling input part for introducing torque and a coupling output part connected to the drive input shaft in a rotationally fast way, wherein the multi-plate coupling is arranged coaxially externally relative to the sleeve-shaped projection and at least partially axially overlaps said sleeve-shaped projection; and
 wherein the coupling output part of the multi-plate coupling comprises a sleeve which, via a toothing, is connected in a rotationally fast way to the drive input shaft and is axially secured by a securing ring against an inner bearing race of a rolling contact bearing at an end of the coupling.

15. A drive assembly according to claim 14, wherein the coupling input part comprises a hollow shaft whose inner diameter is greater than the outer diameter of the drive input shaft, wherein the hollow shaft is arranged coaxially relative to the drive input shaft and partially axially overlaps same.

16. A drive assembly according to claim 15, wherein the hollow shaft is rotatably supported by a first bearing in the coupling housing and by a second bearing on the coupling output part.

17. A drive assembly according to claim 14, wherein the set of coupling plates is supported against a supporting disc connected to a hub and can be loaded by a pressure disc, wherein a setting device is provided for actuating the multi-plate coupling by loading the pressure disc.

18. A drive assembly according to claim 17, wherein the setting device comprises a ball ramp assembly which having two opposed discs with ball grooves whose pitch extends circumferentially in opposite directions, and balls held in the ball grooves, wherein one of the discs is positioned in the coupling housing in a rotationally fast way and the other disc is rotatingly drivable via an electric motor and at least indirectly loads the pressure disc.

19. A drive assembly according to claim 18, wherein the drivable disc is radially centered by the balls relative to the disc arranged in the coupling housing.

\* \* \* \* \*

UNITED STATES PATENT AND TRADEMARK OFFICE
CERTIFICATE OF CORRECTION

| | | |
|---|---|---|
| PATENT NO. | : 7,648,011 B2 | Page 1 of 1 |
| APPLICATION NO. | : 10/570774 | |
| DATED | : January 19, 2010 | |
| INVENTOR(S) | : Kwoka et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 730 days.

Signed and Sealed this

Sixteenth Day of November, 2010

David J. Kappos
*Director of the United States Patent and Trademark Office*